United States Patent [19]

Lanno et al.

[11] Patent Number: 5,128,521
[45] Date of Patent: Jul. 7, 1992

[54] MICROCOMPUTER CONTROLLED TOASTER

[75] Inventors: Dino D. Lanno, Chillicothe; Matthew F. Kollar, Columbus, both of Ohio

[73] Assignee: Hamilton Beach/Proctor-Silex, Inc., Glen Allen, Va.

[21] Appl. No.: 927,983

[22] Filed: Nov. 7, 1986

[51] Int. Cl.⁵ .............................................. H05B 1/02
[52] U.S. Cl. .................................... 219/518; 219/492; 219/497; 99/329 P
[58] Field of Search ............... 219/492, 494, 497, 501, 219/506, 10.55 B, 518, 519; 307/117; 99/328, 329 RT, 330, 333, 334, 335, 337

[56] References Cited

U.S. PATENT DOCUMENTS

| | | | |
|---|---|---|---|
| 4,170,932 | 10/1979 | Lalancette | 219/519 |
| 4,233,498 | 11/1980 | Payne et al. | 219/506 |
| 4,572,935 | 2/1986 | Karino | 219/492 |
| 4,644,137 | 2/1987 | Asahi et al. | 219/506 |

Primary Examiner—Mark H. Paschall
Attorney, Agent, or Firm—Roger S. Dybvig

[57] ABSTRACT

A "pop-up" toaster is controlled by a microcomputer to operate in a toast, bakery or pastry mode to toast a product to some preselected color. The microcomputer includes a memory for storing indications of the toast color selected for the present toaster cycle (TCOLOR), the toast color selected for the previous toasting cycle (TLAST), the mode selected for the present toasting cycle (MODE) and the previous toasting cycle (LMODE) as well as tables of toaster cycle times and tables of compensation values. The microcomputer counts the number of toaster cycles occurring within a predetermined time of the start of the present cycle (TCYCLE) and also develops an indication (TINT) representing the elapsed time between the end of the previous cycle and the beginning of the present cycle. A toast cycle time is selected from the tables depending upon TCYCLE, TINT and TCOLOR. The selected toast cycle time is then modified in various ways depending on MODE, LMODE, the relation of TCOLOR to TLAST, and the magnitude of TINT and TCOLOR. The modified value of toast cycle time is then used by the microcomputer to terminate power to the heating elements of the toaster after the toast cycle time has expired.

16 Claims, 9 Drawing Sheets

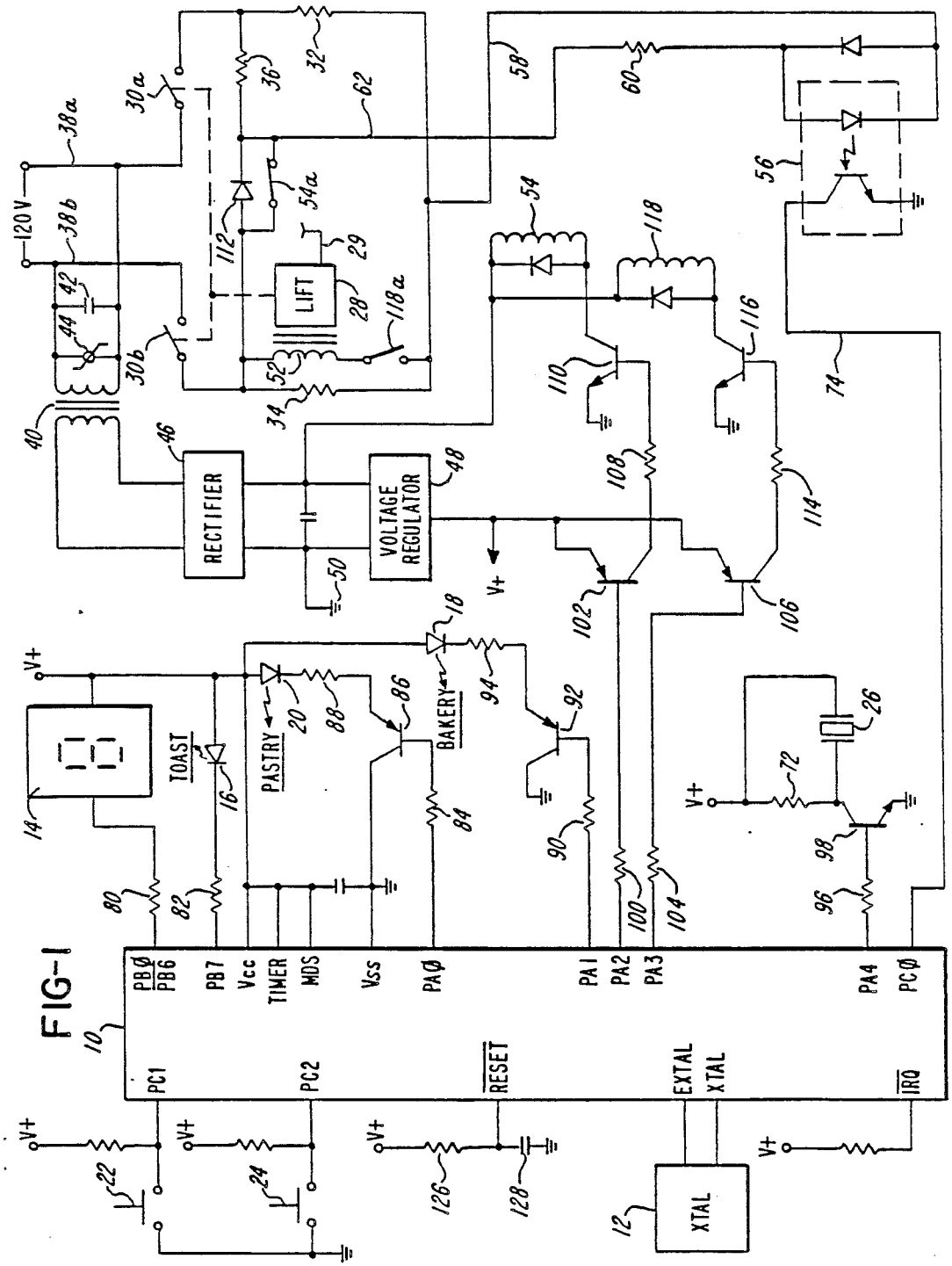

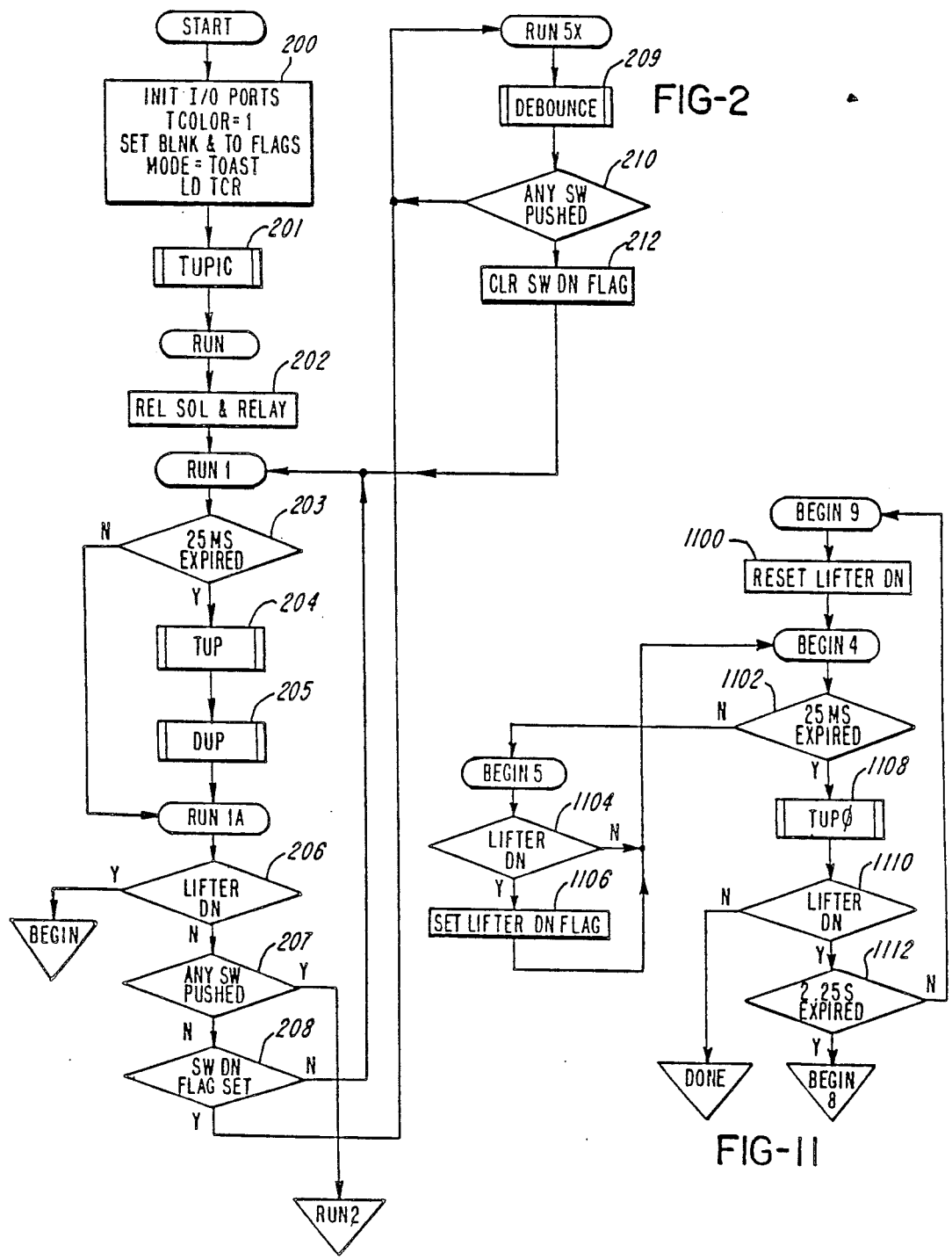

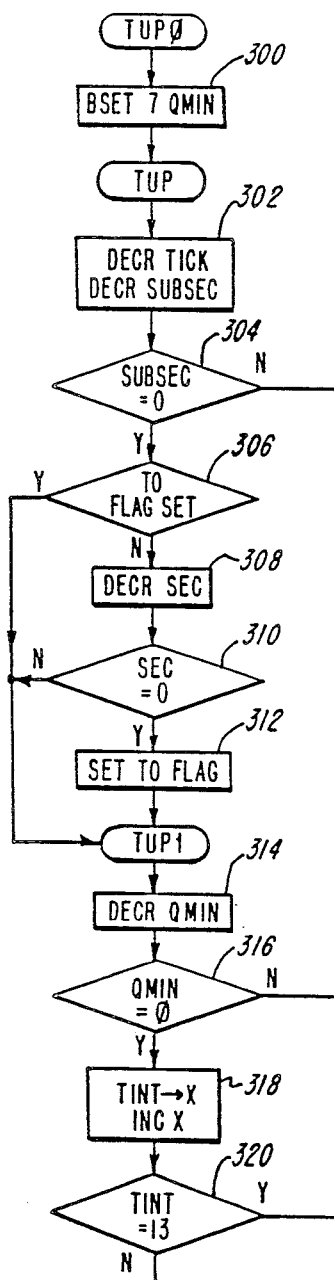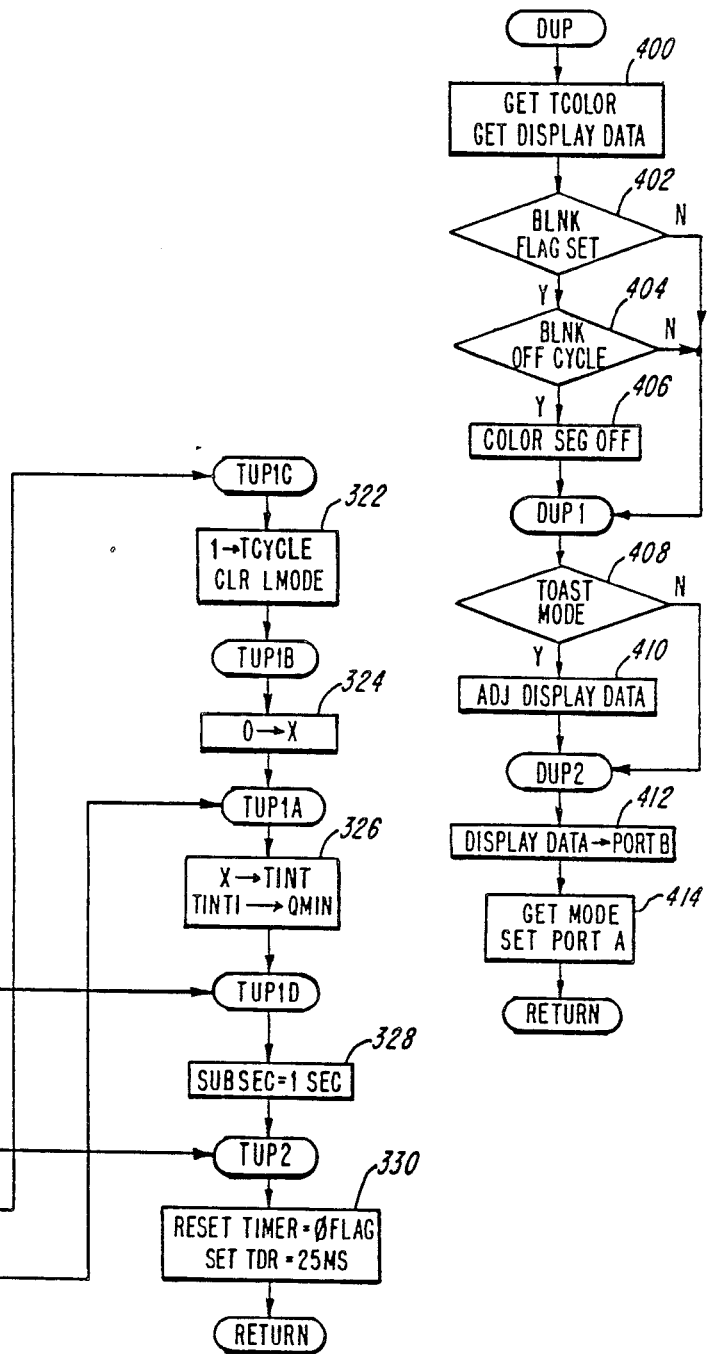

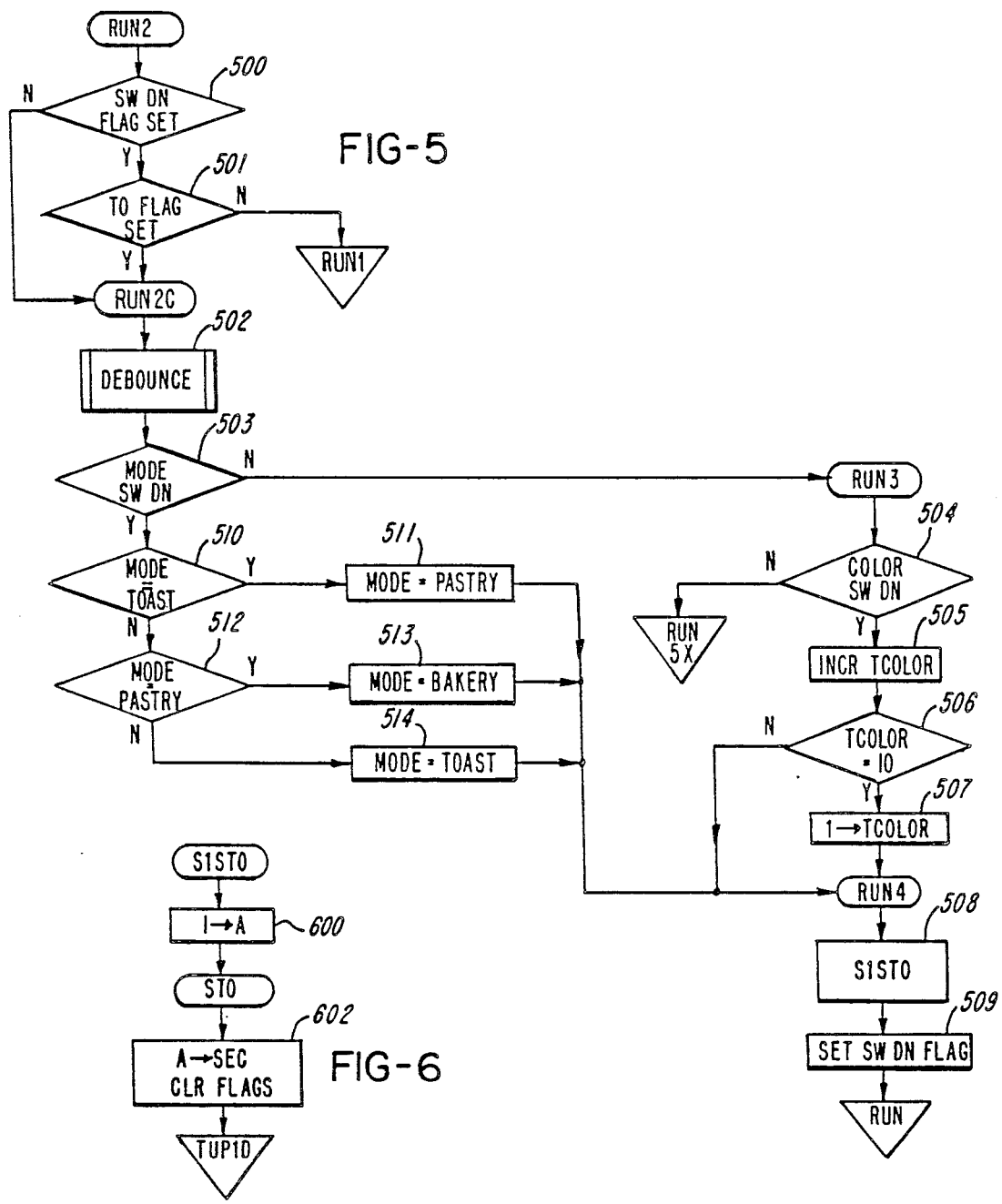

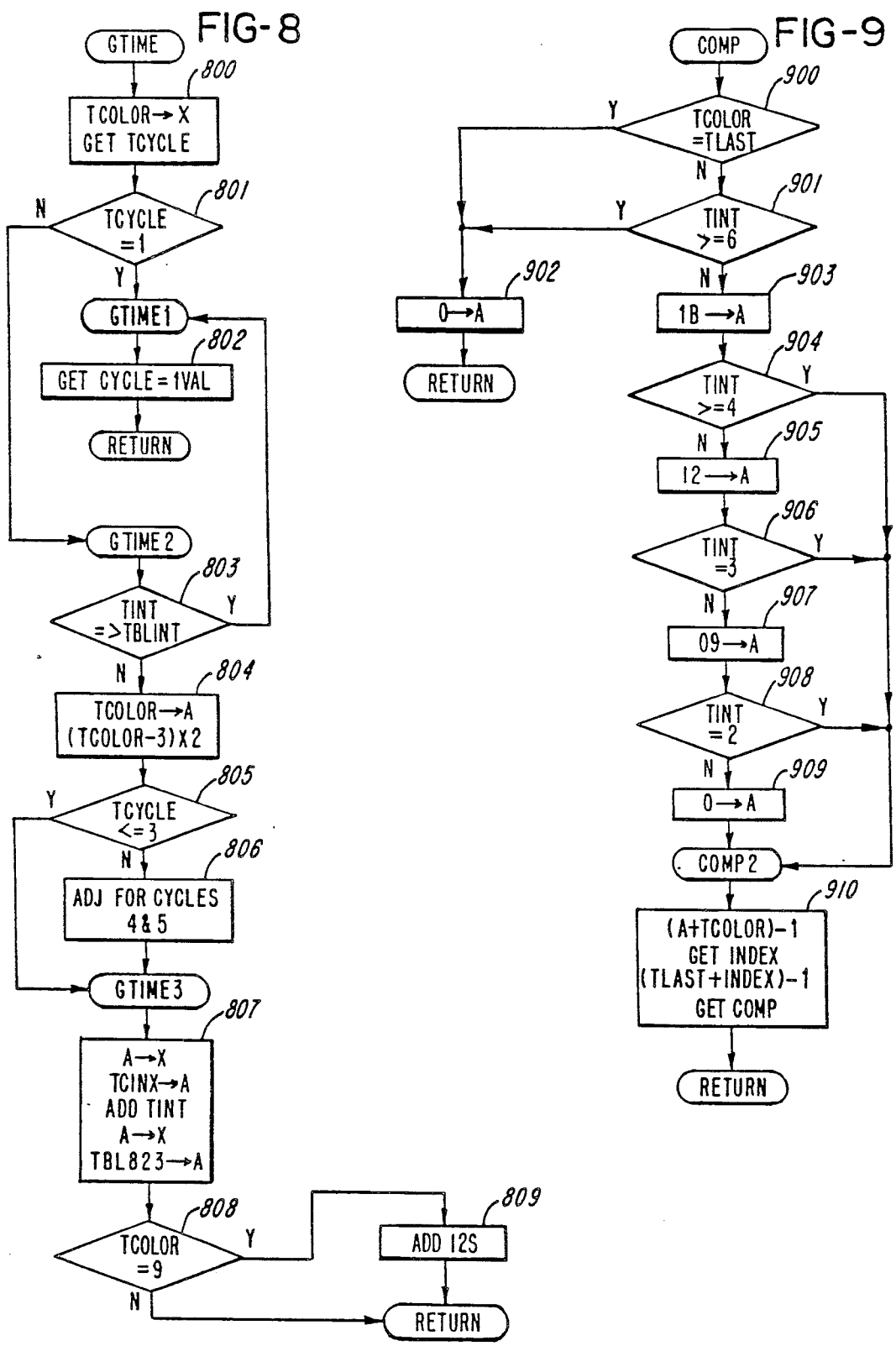

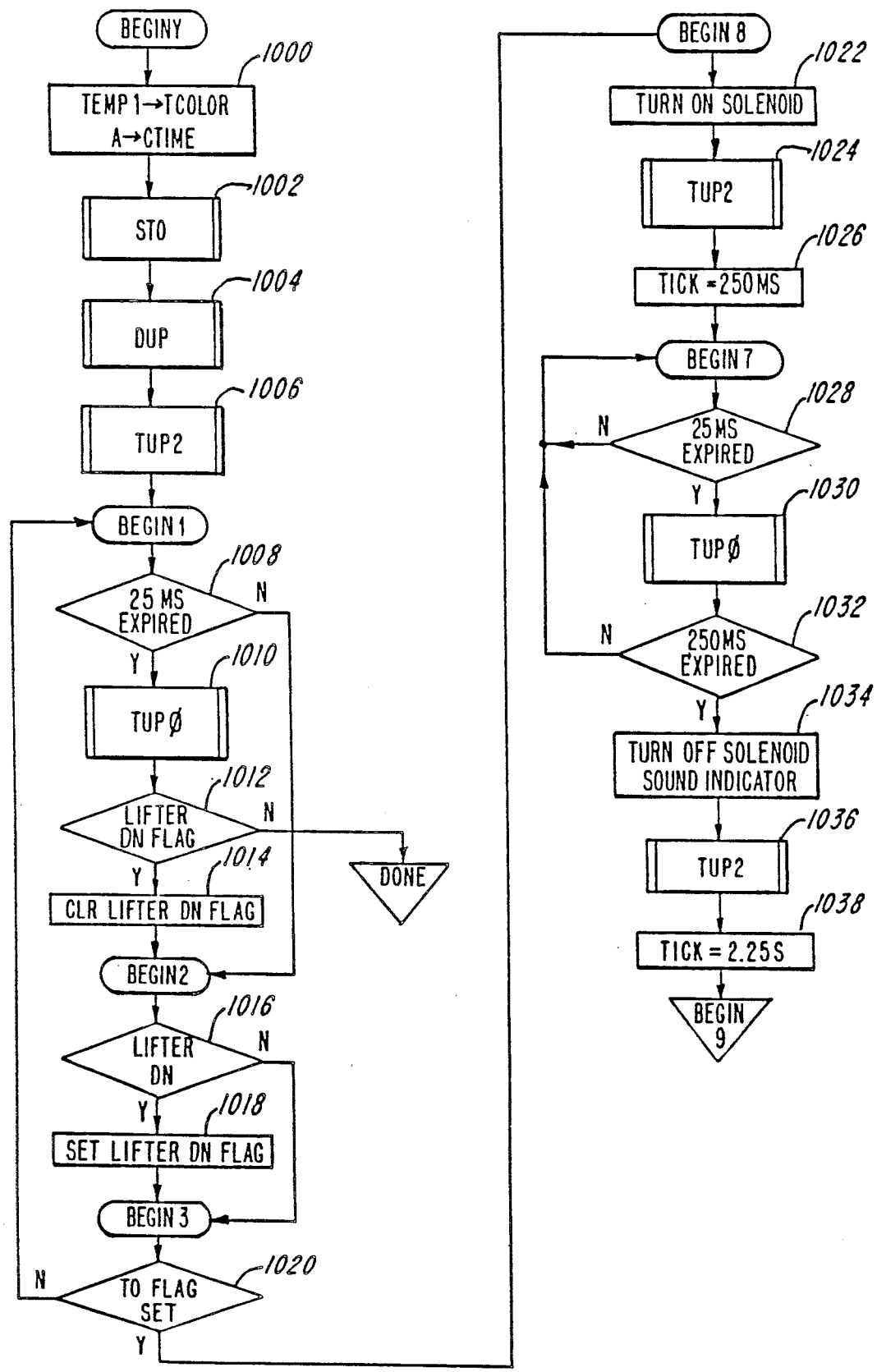

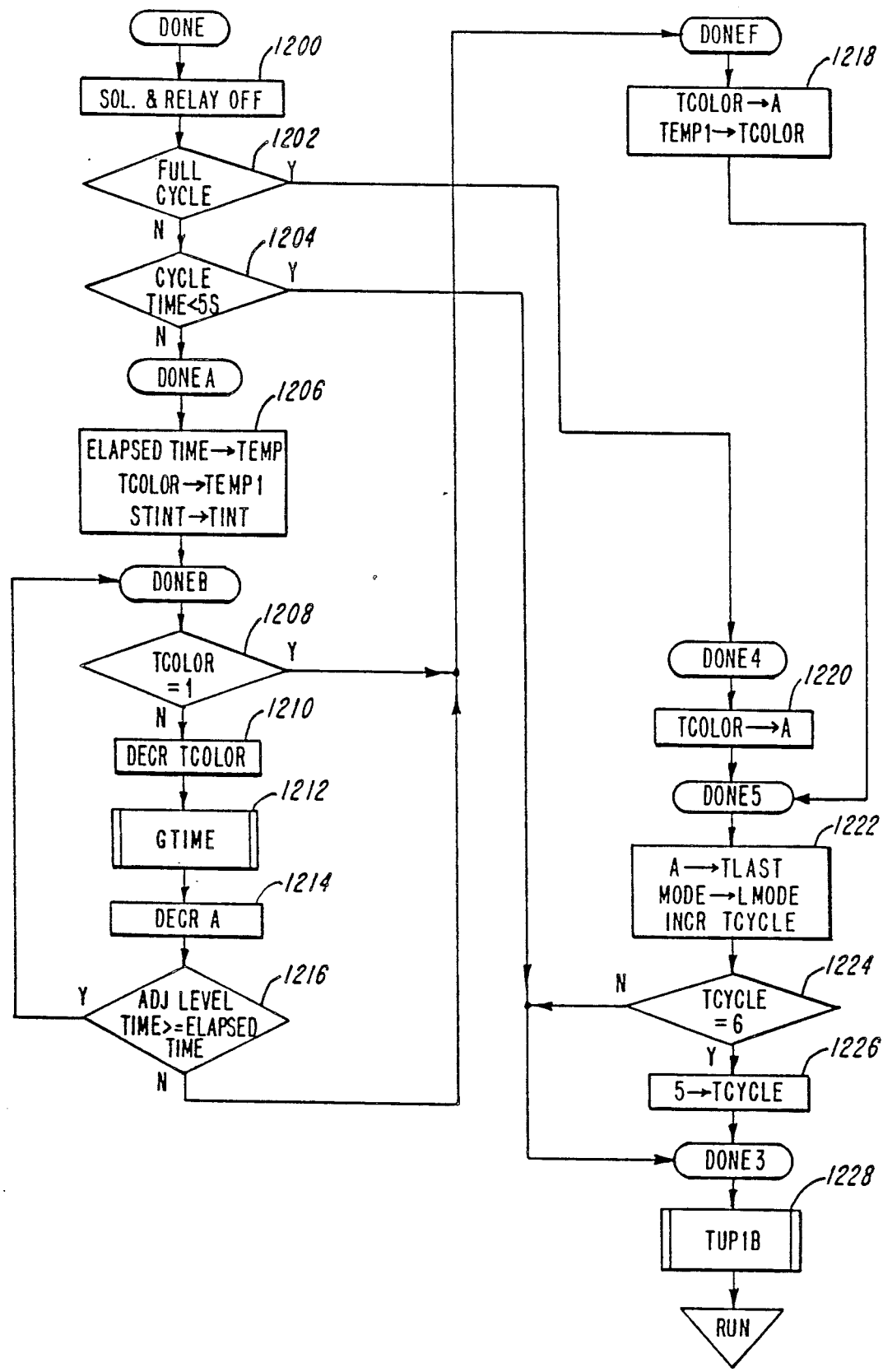

MICROCOMPUTER CONTROLLED TOASTER

FIELD OF THE INVENTION

The present invention relates to a microcomputer-controlled toaster and more particularly to a toaster operable in a toast, pastry or bakery mode to toast a product to a preselected color, compensation being made for various factors affecting the temperature conditions of the toaster at the beginning of a cycle and in turn the time required. Toast cycles are timed and controlled by digital means.

BACKGROUND OF THE INVENTION

Prior art toasters have conventionally employed a bi-metallic element to time the toast cycle, the bi-metallic element bending as it is heated during a cycle and eventually closing a pair of contacts to energize a solenoid which in turn releases a spring loaded lift mechanism so that the toast is raised out of a bread well and a switch is opened to terminate power. Others have proposed the use of solid state heat sensors for controlling the toast cycle. With such arrangements it is difficult to control the toaster such that each cycle toasts to the desired preselected color.

As exemplified by Iida et al. U.S. Pat. No. 3,431,400, Rolland U.S. Pat. No. 4,518,849 and Schneider U.S. Pat. No. 4,510,376, some toasters avoid the use of the bi-metallic element by using an analog electrical timing circuit for controlling the toast cycle time. In addition, Schneider U.S. Pat. No. 4,510,376 purports to compensate to a lesser degree for the differences in the preceding heating cycle time and cool down interval. However, the known prior toasters do not fully take into account the preceding cycle time, the mode during the previous cycle, the number of previous toasting cycles occurring within a few minutes of the start of a given cycle, the color to which bread was toasted during the preceding cycle, or whether or not the last cycle was manually interrupted before completion. Furthermore, those which do not rely on temperature sensors are not readily adaptable for use as multi-mode toasters.

Norwood U.S. Pat. No. 4,345,145 discloses a toaster oven employing a combination of digital and analog circuit techniques. In this device an integrator is utilized to control cycle time such that a desired toast color is obtained independently of the temperature of the toast compartment at the beginning of the cycle.

SUMMARY OF THE INVENTION

An object of the present invention is to provide a microcomputer controlled toaster employing only digital techniques, and operable in a plurality of modes to compensate for various factors affecting the temperature of the toaster at the beginning of a cycle. A cycle time is selected from a plurality of toast color tables, the cycle time being determined by the selected toast color and the elapsed time since the last toast cycle. The selected toast cycle time is then modified in varying degrees depending on the mode for the present and previous cycles, the number of cycles within a predetermined immediately preceding interval of time, and the selected toast color. For the toast or pastry mode a further compensation is provided, based on the elapsed time since the previous cycle, if the selected color for the present cycle is not the same as the selected color of the previous cycle. A numerical value representing the fully compensated toast cycle time is periodically decremented and when it reaches a predetermined value the microcomputer produces a signal to energize a solenoid. A toaster lift mechanism then opens contacts supplying power to the heating elements of the toaster and raises the toasted product so that it may be removed from the toaster. Provision is made for automatically adjusting the selected toast color on cycles which are manually terminated prior to completion, the toast color being adjusted to that color to which the product was toasted at the time the cycle was terminated. The adjusted toast color is then utilized in compensating the cycle time of the next cycle.

BRIEF DESCRIPTION OF DRAWINGS

FIG. 1 is a schematic wiring diagram of a microcomputer control system for a toaster;

FIGS. 2, 5, 7, and 10–12 are flow diagrams illustrating the main program routine executed by the microcomputer;

FIG. 3 is a flow diagram illustrating the Timer Update subroutine;

FIG. 4 is a flow diagram illustrating the Display Update subroutine;

FIG. 6 is a flow diagram illustrating the Set One Second Timeout subroutine;

FIG. 8 is a flow diagram illustrating the Get Time subroutine;

FIG. 9 is a flow diagram illustrating the Compensation subroutine; and,

DESCRIPTION OF A PREFERRED EMBODIMENT

Figure 7:
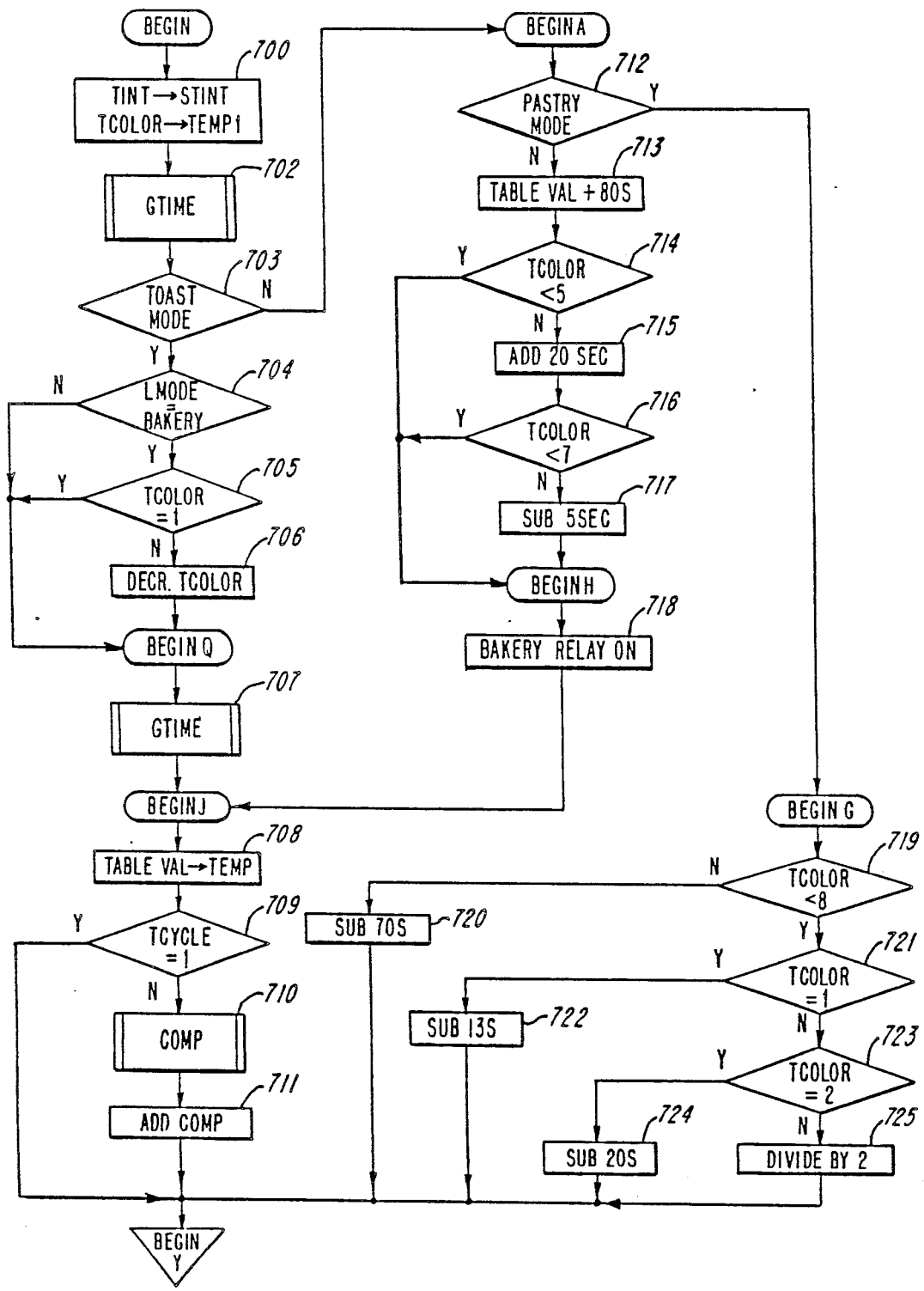

As illustrated in FIG. 1, a microprocomputer controlled toaster constructed in accordance with the principles of the present invention comprises a microprocomputer 10 timed by an oscillator crystal 12, a digital toast color display 14, a plurality of mode indicators 16, 18 and 20, a mode selection switch 22, a color selection switch 24, a piezoelectric sound transducer 26, a toast lift mechanism 28 controlling a pair of lift switches 30a and 30b, and right, left and center resistance heating elements 32, 34 and 36.

The toaster is provided with an appliance cord (not shown) connected to a pair of leads 38a and 38b. The toaster may thus be plugged into a conventional electrical outlet or other source of AC electric power. In order to provide a 5V logic voltage for the microcomputer 10, display 14 and indicators 16, 18 and 20, the leads 38a and 38b are connected to the primary winding of a stepdown transformer and the secondary winding is connected to a full wave rectifier 46. The transformer produces a 12.6V AC output which is rectified by rectifier 46 and applied to a voltage regulator 48. The voltage regulator produces 5V DC between its V+ output terminal and logic ground 50.

For the purpose of illustrating the invention, it is assumed that the toaster is a conventional household toaster of the "pop-up" type having two parallel slots in the top into which two slices of bread may be inserted. The lift mechanism 28 includes a lift lever 29 which may be manually depressed to lower the bread into the bread wells. When the lever is depressed so that the lift mechanism reaches a latching position, the lift mechanism closes lift switches 30a and 30b. Closure of switches 30a and 30b energizes the heating elements 32, 34 and 36 and sends a signal to the microcomputer 10. The circuit for energizing the right and left heating elements extends from lead 38a through switch 30a, heating elements 32 and 34, and switch 30b to lead 38b. The circuit for energizing the center heating element 36 extends from lead 38a through switch 30a, heating element 36, normally closed relay contacts 54a and switch 30b to lead 38b.

An electro-optical isolator 56 is provided for signalling the microcomputer 10 when the lift mechanism 28 is latched. A lead 58 is connected from the midpoint between heating elements 32 and 34 to one side of a light-emitting element in the isolator 56 and the other side of the light-emitting element is connected through a resistor 60 a lead 62 to relay contacts 54a, diode 112 and center heating element 36. When switches 30a and 30b are closed the light-emitting element in the isolator 56 is energized and causes a light sensitive element therein to conduct thereby connecting microcomputer input lead 74 to logic ground. This signals the microcomputer that a toasting cycle has been initiated.

Figure 13:
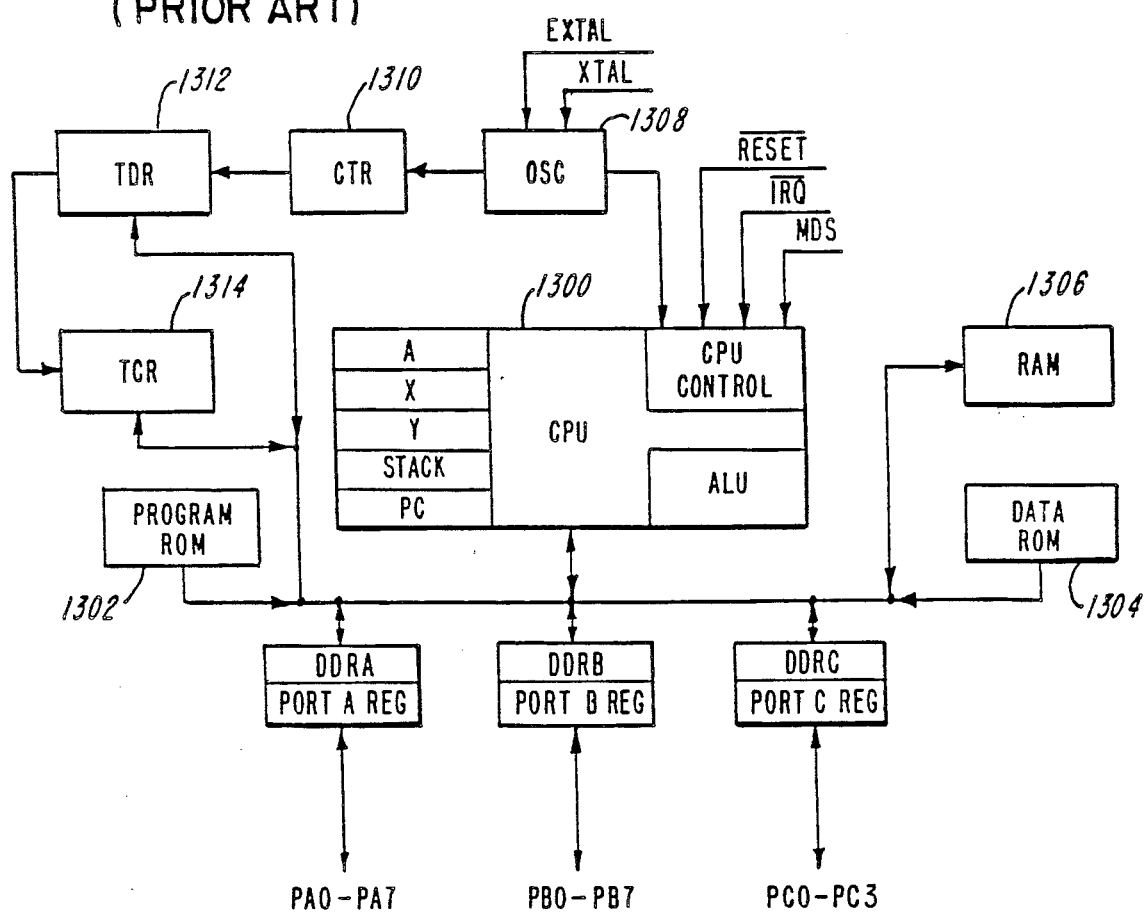
FIG. 13 is a block diagram of a microcomputer suitable for use in digitally controlling a toaster.

The microcomputer 10 may be a type MC 6805P2 manufactured by Motorola Inc. Since the microcomputer 10 is commercially available and is described in Motorola literature, it is only conceptually illustrated in FIG. 13. The microcomputer includes an 8-bit microprocessor 1300, a 1K program ROM 1302, a 64-byte data ROM 1304, a 64-byte RAM 1306, an oscillator 1308, 20 I/0 channels and a timer including a prescaler counter 1310, a timer data register 1312 and a timer control register 1314, all located on the microcomputer chip.

The timer is extensively used in the present invention to time 25ms intervals. The oscillator 1308 drives the prescaler 1310 which is an 8-bit counter. The output of the prescaler drives the timer data register (TDR) which is an addressable 8-bit register/counter. A value is loaded into TDR to time an interval. Each output from prescaler 1310 decrements the value in TDR. When the value in TDR has been reduced to zero TDR produces an output to set bit 7 of the timer control register (TCR). TCR bits 0–6 are not used in the present invention.

TCR bit 7 is sampled at various times by the microprocessor 1300 to see if the 25ms interval has expired. TCR may also be addressed by the microprocessor to reset bit 7 which is the Timer=100 flag.

The microprocessor 1300 is shown as having conventional A (accumulator), X, Y, stack and program counter registers as well as an arithmetic logic unit (ALU) and central processing unit controls. However, in actual practice the X and Y registers are located in the RAM 1306.

The channels are divided into two 8-bit ports PA and PB and a 4-bit port PC. Each channel includes a data direction register (DDR). The bit positions of a port are individually addressable and a bit position of a port may be programmed for either input or output by setting a corresponding bit in the data direction register for the port.

All bit positions of Port B are programmed for output. The color display 14 (FIG. 1) is a seven-segment display and bit positions PB$\phi$–PB6 are connected through seven resistors 80 to the segments of the display. Bit position 7 (PB7) is connected through a resistor 82 to the mode indicator 16.

PA$\phi$ and PA1 are programmed to provide output signals. PA$\phi$ is connected through a resistor 84 to the base of a transistor 86. The collector of the transistor is grounded and the emitter is connected through a resistor 88 and the indicator 20 to V+. In like manner, PA1 is connected through a resistor 90 to the base of a transistor 92 with the transistor having a grounded collector and an emitter connected through a resistor 94 and indicator 18 to V+.

Indicators 16, 18 and 20 may be LEDs or similar visual indicators. Indicator 16 is the toast mode indicator and it is lit any time the toaster is in the toast mode. Similarly, indicators 18 and 20 are lit to indicate that the toaster is in the bakery or pastry mode, respectively. The indicators 16, 18 and 20 are energized in sequence in response to successive actuations of the mode selection switch 22. One side of the mode switch is connected to logic ground while the other side is connected to the bit 1 position of Port C.

As subsequently explained, when power is applied to the toaster the microcomputer 10 produces a signal at PB7 to energize the toast indicator 16. If the mode switch is then depressed the microcomputer 10 terminates the signal at PB7 and initiates a signal at PA$\phi$ to light the pastry indicator 20. A further actuation of the mode switch causes the microcomputer 10 to terminate the signal at PA$\phi$ and initiate a signal at PA1 thereby extinguishing the pastry mode indicator 20 and illuminating the bakery mode indicator 18. Another actuation of the mode switch 22 causes the bakery mode indicator to be extinguished and the toast mode indicator to be illuminated again. As subsequently explained, the microcomputer senses the state of the mode switch 22 at one-second intervals so that if the mode switch is held depressed the mode indicators 16, 18 and 20 are turned on in sequence for one second, with the indicator that is on at the time the switch is released remaining on.

One side of color switch 24 is connected to logic ground and the other side is connected to bit position 2 of Port C. The user operates the color switch 24 to select the desired degree of toasting of the product in the toaster. The color of the product after toasting is an indication of the degree of toasting. The color display 14 indicates the selected color and is capable of displaying the digits 1 (lightest color) to 9 (darkest color). When power is first applied to the toaster the microcomputer 10 produces signals at PB$\phi$–PB6 to energize the display to show the numeral 1. Each time the color switch 24 is actuated the count displayed by the color display is advanced by one and upon reaching the numeral 9 recycles to 1. If the switch 24 is held depressed, the microcomputer changes the output signals PB$\phi$–PB6 once every second so that the display is automatically incremented once each second until the switch is released.

Once the lift mechanism 28 closes switches 30a and 30b to begin a toasting cycle, and this condition is conveyed to the microcomputer 10 by a signal on lead 74, the program of the microcomputer no longer senses the conditions of the switches 22 and 24 thus making it impossible to change the mode or color selection during the toasting cycle.

The piezoelectric sound transducer 26 is provided to give an audible indication when a toasting cycle is completed or terminated. The microcomputer 10 produces a signal at PA4 when the signal applied to PC$\phi$ is terminated either upon completion of a toasting cycle or interruption of a toasting cycle by the user applying upward pressure to the lift lever 29. The signal at PA4 is applied through a resistor 96 to the base of a transistor 98 having a grounded emitter. The collector of the transistor is connected through the transducer 26 and a parallel connected resistor 72 to V+ so that when a signal is produced at PA4 the transducer generates an audible signal.

Bit positions 2 and 3 of Port A are used to produce output signals for controlling the toaster AC wiring circuits. PA2 is connected through a resistor 100 to the base of a transistor 102 while PA3 is connected through a resistor 104 to the base of a transistor 106. The emitters of the transistors are connected to V+. The collector of transistor 102 is connected through a resistor 108 to the base of a transistor 110 which has a grounded emitter. The collector of transistor 110 is connected through the coil of relay 54 to the unregulated DC output of rectifier 46.

In the bakery mode the toaster may bake two slices of bread with one side of each piece of bread (the side facing the outer or right and left heating elements 32 or 34) being toasted to the color indicated by color display 14. In this mode it is preferred that the center heating element 36 heat the bread but not toast it to the specified color. Therefore, in the bakery mode the microcomputer 10 produces a signal at PA2 to turn on transistor 102. The output of transistor 102 then turns on transistor 110 to energize relay 54. This opens the normally closed relay contacts 54a. Thus, during the bakery mode there is a circuit extending from switch 30a through the center heating element 36 and a diode 112 to switch 30b so that the center heating element is energized with half-wave rectified AC.

The relay 54 is not energized when the toaster is in the toast or pastry mode. In these modes the full wave AC is applied to the center heating element 36 over a circuit which extends from switch 30a through the heating element 36, and closed contacts 54a to switch 30b.

The microcomputer 10 produces a signal at PA3 to end each toasting cycle. The signal at PA3 turns on transistor 106 whose collector is connected through a resistor 114 to the base of a transistor 116. The emitter of transistor is grounded and the collector is connected to one end of a relay coil 118. The other end of coil 118 is connected to the unregulated output of rectifier 46. The arrangement is such that the signal PA3 turns transition 106 on, the output of transistor 106 turns transistor 116 on thereby energizing relay 118. When relay 118 is energized its contacts 118a close. This energizes the solenoid 52 which unlatches the lift mechanism 28. The lift mechanism then moves upwardly under spring pressure to raise the toast. As the lift mechanism moves upwardly the contacts 30a and 30b open thereby terminating power to the heating elements and the solenoid 52.

TYPICAL OPERATION

FIGS. 2-12 are flow diagrams illustrating the operation of the toaster. When AC power is applied to the toaster so that V+ is generated by voltage regulator 48, the voltage acts through a resistor 126 to charge a capacitor 128. The positive-going signal resets the microprocessor 1300 and the program counter therein is loaded with the address of the first microprocessor instruction to thereby start the microprocessor program. As shown in FIG. 2, the program starts at step 200 by initializing the I/0 ports so that ports PA and PB are outputs and PC is an input. The microprocessor generates the value 1 and stores it at TCOLOR, the location in RAM reserved for the toast color indication. A Blink flag and a Timeout Expired flag are stored at FLAGS, a location reserved for program flags, and a bit indicating the toast mode is stored at MODE, the mode word location. The microprocessor then loads the timer control register TCR, setting up the timer to time 25ms intervals, and jumps to the Timer Update (TUP) subroutine shown in FIG. 3.

The Timer Update subroutine is entered at TUP1C and at step 322 the value one is stored at TCYCLE, the location reserved for the current toast cycle count. The location LMODE, which store an indication of the mode during the preceding cycle, is cleared. At step 324 the value $\phi$ is stored in the X register and at step 326 this value is stored as TINT, the current toast cycle interval. TINT provides an indirect indication of the time interval between the end of the last cycle and the start of the present one as shown in Table III, below.

A table TINTI is then accessed to obtain a value representing an interval of the relatch time, i.e. an increment of the time between the completion of the last toaster cycle and the beginning of the present one. The table is accessed by adding its base address to the value of TINT in the X register. The value read from the table is stored at the relatch timer location QMIN. The TINTI table stores 13 values, one for each possible value of TINT. The total of all 13 values is equal to 10 minutes.

At step 328 location SUBSEC is loaded with the value 40. As subsequently described, this location is later decremented each time the TUP subroutine is executed and reaches a count of zero one second after it is loaded.

At step 330, the Timer=$\phi$ flag in TCR 1314 is reset and the TDR 1312 is loaded with a value corresponding to 25ms. The program then returns to the Start routine (FIG. 2) where, at step 202 it applies signals to ports PA2 and PA3 to release relays 54 and 118. This closes contacts 54a but opens the contacts 118a which are connected in series with the solenoid 52.

The Timer=$\phi$ flag is sampled at step 203 to see if 25ms has elapsed since TDR was loaded. Assuming 25ms has not elapsed, the program branches to step 206 where port PC$\phi$ is tested to see if the lift lever 29 has been depressed to start a toaster cycle. Assuming the lever has not been depressed, ports PC1 and PC2 are sampled at step 207 to see if the mode switch 22 or color switch 24 is depressed. Assuming neither is depressed, the Switch Down flag is tested at step 208 and since it has not been set the program branches back to step 203 where the timer is again tested to see if 25ms has elapsed.

The RUN 1 loop comprising steps 203 and 206-208 is executed until one of the conditions tested for proves true. Assume that after the power is turned on the user does nothing so that the first condition is met at step 203 after 25ms. The program jumps to the Timer Update subroutine and enters the subroutine at step 302 where TICK and SUBSEC are decremented. TICK is a location in RAM used to time certain events such as the flashing of the color display 14 during the interval after power is turned on but before the color pushbutton 24 is depressed. SUBSEC is used to time one-second intervals for various purposes such as advancing the display as subsequently described.

At step 304 SUBSEC is tested to see if it has been decremented to zero. Assuming it has not, the program branches to step 330, resets the Timer=$\phi$ flag, loads a 25ms value in TDR and returns to the Start routine. Upon return to the Start routine, at step 205, the program jumps to the Display Update (DUP) subroutine shown in FIG. 4. The subroutine is entered at step 400 where TCOLOR is fetched and added to the base address of a table which stores values for lighting the segments of the toast color display 14 and extinguishing the toast mode indicator 16. Since TCOLOR = 1, the value read from the table will, when applied to PB$\phi$–PB7, cause display 14 to display the numeral 1 and indicator 16 to be extinguished.

The Blink flag is tested at step 402 and since the flag was set at step 200 the program proceeds to step 404 where TICK is tested to see if the display should be on or off. Bit 4 of TICK is tested. Since TICK assumes a value of zero when power is turned on and is decremented (at step 302) each time the TUP subroutine is executed, bit 4 switches between a binary 1 and 0 at approximately 0.4 sec. intervals. If bit 4 is a zero the program branches from step 404 to step 408. On the other hand, if bit 4 is a one the program proceeds to step 406 where a value is generated which, when applied to Port A, will turn off both the color display 14 and the toast mode indicator 16.

At step 408, MODE is tested to see if the toast mode bit is set. This bit was set at step 200 so the program executes step 410 to adjust the high order bit of the display data so that when the data is applied to Port B at step 412 the toast mode indicator 16 will be turned on. At the same time, the toast color display 14 will flash on or off depending upon whether the blink off test at step 404 proved to be false or true, respectively.

After the display data is sent to Port B, the program executes step 414 where it fetches MODE and checks bits therein to see if the toaster is in the pastry or bakery mode. It is in the toast mode so signals are sent to Port A to turn off the pastry and bakery mode indicators 18 and 20. The program then returns to the Start routine.

Upon returning to the Start routine the program repeatedly executes the Run 1 loop until one of the conditions tested at steps 206–208 is met. Every 25ms the test at step 203 proves true and the program jumps to TUP to decrement TICK and SUBSEC and to DUP to turn the digital display on or off. The toast mode indicator 16 is continuously illuminated while the display 14 shows the numeral 1 in a flashing mode. After 1 second SUBSEC is reduced to zero and the test at step 304 proves true so the program moves to step 306 where the Timeout flag is tested. The flag is set so the program branches to step 314 where QMIN is then tested at step 316 and if it is not 13 the program branches to step 328 and proceeds as described above.

If QMIN is decremented to zero then the program proceeds from step 316 to step 318 where TINT is incremented. TINT is then tested to see if it has reached the value 13. If TINT is not 13 the program proceeds to step 326 where TINT is used to obtain a new value from the TINTI table, the value being loaded into QMIN.

If the test at step 320 shows TINT is equal to 13, it means that 10 minutes has elapsed since the last toast cycle. This is sufficient time for the toaster to cool down. Therefore, the toaster may proceed as if the present toast cycle is the first. The program proceeds from step 320 to step 322 where TCYCLE is set to 1 and LMODE is cleared. Steps 324 and 326 again set TINT to 0 and use it to access the first value stored in TINTI, the value read from the table being stored at QMIN. After resetting SUBSEC and TDR to time 1 second and 25ms, respectively, the program returns to the Start routine.

Assume that the next action taken by the user is to depress the toast color switch 24. This condition is sensed when the program executes step 207 and the program branches to the Run 2 routine shown in FIG. 5. At step 500 the Switch Down flag bit of FLAGS is tested and since it has not yet been set the program branches to step 502 where it jumps to a Debounce subroutine. This subroutine is not illustrated since it merely involves delaying the program for about 5ms. to allow time for switch debouncing. The program then returns to the Run 2 routine at step 503 where a test is made to see if the mode switch 22 has been depressed. Assuming the mode switch has not yet been depressed the program branches to step 504 where a test is made to see if the color switch 24 is still depressed. It is assumed that the switch 24 is depressed so the program executes step 505 to increment TCOLOR by one and step 506 to see if the incremented value is equal to 10. TCOLOR now has the value 2 so the program branches from step 506 to step 508. If the test at step 506 has proved true, TCOLOR would have been set to 1 at step 507 before executing step 508.

At step 508 the program jumps to the S1STO subroutine which sets values for timing 1-second intervals. As shown in FIG. 6, S1STO loads location SEC with the value 1, clears all program flags, and branches to step 328 of the Timer Update subroutine (FIG. 3) to set SUBSEC to time a 1-second interval, reset the Timer = $\phi$ flag, and load TDR 1312 with a value to time a 25ms interval. A return is then made to FIG. 5, step 509, where the Switch Down program flag is set.

From step 509 the program jumps to step 202 of the Run routine (FIG. 2) to release relays 54 and 118 (both already released). After this is done the program enters the Run 1 loop previously described. If the color switch 24 is still being depressed the program leaves the RUN 1 loop at step 207 and branches again to RUN 2 (FIG. 5). At step 500 it finds the Switch Down flag set so it proceeds to step 501 where it finds the Timeout flag is not set. The program then branches back to step 203 of Run 1 to repeat steps 203, 206, 207, 500 and 501. At the end of 25ms the test at step 203 proves true and the program jumps to TUP and DUP as previously described to update the time counts and the display. Since the Blink Flag was reset at step 600, the DUP subroutine always branches from step 402 to 404. This means that the color display 14 no longer flashes but continuously displays the toast color numeral. Since TCOLOR was incremented at step 505 the value 2 is added to the base address of the display data table at step 400 to obtain a value which, when applied to PB$\phi$–PB6, will light the segments of display 14 forming the numeral 2. Since the toaster is still in the toast mode, the adjustment is made to the display data at step 410 so that the toast indicator is also illuminated.

The toast color display 14 is incremented by 1 each second if the color switch 24 is held depressed. This is accomplished as follows. As long as the color switch 24 is held down the microprocessor repeatedly executes steps 203, 206, 207, 500 and 501, jumping to the TUP and DUP routines once every 25ms when the test at step 203 proves true. SUBSEC is decremented at step 302 each time TUP is executed and the value in SUBSEC is then tested at step 304 to see if the value 40, initially loaded therein at step 328, has been reduced to zero. After one second the count has been reduced to zero and the program proceeds to step 306 where the Timeout bit of FLAGS is tested. Since this bit was reset at step 600 the program executes step 308 which decrements the count in SEC. SEC is then tested for a zero value at step 310. Since SEC was set to 1 at step 600 and was decremented at step 308, the test at step 310 proves true and the program advances to step 312 where the Timeout bit in FLAGS is set. TINT, QMIN, SUBSEC and TDR are updated as previously described and a return is made to the Start routine.

After jumping to perform DUP again, the program executes steps 206 and 207. Since it is assumed that the color switch 24 is still depressed, the program branches from step 207 to the RUN 2 routine (FIG. 5). The switch down flag was set the last time step 509 was executed and the Timeout flag was set at step 312. Therefore, the program executes steps 500-509 as previously described. At step 505 TCOLOR is incremented so that it has the value 3 and during execution of the S1STO subroutine 508 the program flags are cleared and SEC is again set to toll 1 second. The Switch Down flag is then set before the program branches back to the RUN routine. From the foregoing description it should be evident that the RUN 1 loop is again repeatedly executed until the test at step 203 proves true at which time the jumps are made to TUP and DUP to update the timers and the display. At this point the toast color display 14 will show the numeral 3 (non-flashing) and the toast mode indicator 16 will still be illuminated. Continued depression of the color switch 24 causes the toast color display 14 to be incremented by one each second, and to roll back to 1 after the numeral 9 is displayed.

Assume that the user now releases the color switch 24. On the next pass through RUN 1, the test at step 207 proves false so the Switch Down flag is tested at step 208. The flag was set the last time step 509 was executed so the program executes a Debounce subroutine at step 209. The Debounce subroutine introduces a delay of 5ms to eliminate spurious signals as the color switch 24 opens. Next, PC1 and PC2 are tested at step 210 to see if either the mode switch 22 or color switch 24 is depressed. If either is depressed, the program branches back to repeat the Debounce routine. If neither switch is depressed, the Switch Down flag is cleared at step 212 and the program branches back to RUN 1. The loop comprising steps 203-208 is then repeatedly executed until a switch is depressed.

Assume now that the mode switch 22 is depressed to change the toaster mode. Actuation of the switch is sensed at step 207 and the program branches to FIG. 5 where the test at step 500 proves false. The program jumps to execute the switch Debounce subroutine 502 and upon return from the subroutine the mode switch is tested at step 503. Since the mode switch is actuated, MODE is tested at step 511. Since it is assumed that the toast mode bit is set, the program branches to step 511 where the toast mode bit is cleared and the pastry mode bit is set. On the other hand, if the test at step 510 had showed that the toast mode bit was not set, the program would have executed step 512 to see if the pastry mode bit was set. If the pastry mode bit was set the program would have branched to step 513 to clear the pastry mode bit and set the bakery mode bit. If the test at step 512 proved false then the toaster must have been in the bakery mode so the program would have moved to step 514 to reset the bakery mode bit and set the toast mode bit.

Returning to the assumed condition, after execution of step 511 the program branches to RUN 4 where it jumps to the S1STO subroutine (FIG. 6) to clear FLAGS and set SEC to time 1 second. After branching to TUP1D to load SUBSEC and TDR and clear the Timer=$\phi$ flag, a return is made to step 509 to set the Switch Down flag and a branch is taken to RUN (FIG. 2). After the relays 54 and 118 are released at step 202 the RUN 1 loop is entered and steps 203, 206, 207, 500, and 501 are executed until the test at step 203 proves true. At this time TUP and DUP are executed to update the timers and the display. The operations performed during execution of TUP are the same as described above when the color switch 24 was depressed. In execution of DUP, the program proceeds through steps 400 and branches from step 402 to step 408. Since MODE is now set for pastry, a branch is made to step 412. The branching around step 410 means that the display data read from memory at step 400 will light the correct segments of display 14 to display the selected toast color while the toast mode indicator 16 will be turned off. MODE is then fetched at step 414 and applied to port A. Since MODE is now set for pastry, the indicator 20 is illuminated.

If the mode switch 22 is held depressed the mode indication is changed once each second. After the lapse of each second the Timeout flag is set at step 310 in the same manner as when the color display 14 is automatically incremented. In FIG. 5, the flag is sensed at step 501 and the program executes steps 502 and 503. Since it is assumed the mode switch 22 is still depressed, the program executes steps 510, 512 and 513 to change the mode from pastry to bakery and then branches to RUN 4 and proceeds as previously described. The previously lit pastry mode indicator is turned off and the bakery mode indicator is turned on at step 412 the next time DUP is executed.

If the mode switch is held depressed for another second then upon executing RUN 2 the program proceeds to step 514 to again set MODE to indicate toast.

When the mode switch 22 is released, the condition is sensed at step 207 and since the Switch Down flag is set the program proceeds to RUN 5X to debounce the switch opening and clear the Switch Down flag, just as when the color switch 24 is released.

The actual toasting cycle begins when the lift lever 29 is depressed so that the lift mechanism closes switches 30a and 30b to apply power to the heating elements. Closure of the switches also energizes electro-optical isolator 56 and it applies a signal to PC$\phi$. As the microprocessor executes the RUN 1 loop, it senses the input signal from isolator 56 at step 206 and branches to the BEGIN routine shown in FIG. 7.

The purpose of the BEGIN routine is to determine the duration of the toasting cycle. The duration of any given cycle is influenced by several factors including: mode of the current cycle; toast color for the current cycle; mode of the previous cycle; toast color of the previous cycle; the relatch time, i.e. the time that has elapsed between the unlatching of the lift mechanism 28 at the termination of the previous cycle and the latching of the lift mechanism at the beginning of the present cycle; the cycle number, i.e. how many times the lift lever 29 has been depressed since the toaster was at room temperature; the reset time, i.e. the amount of time required for the toaster to cool to room temperature.

Computation of the toast cycle time begins at step 700 by saving the current cycle interval (TINT) at STINT and saving the current toast color (TCOLOR) at TEMP1. The program then jumps to the GTIME subroutine shown in FIG. 8.

The purpose of GTIME is to determine the basic toast cycle time based on the selected toast color (TCOLOR), the number of the current toast cycle (TCYCLE) and the elapsed time between the last cycle and the present one. GTIME begins at step 800 by placing TCOLOR in the X register and TCYCLE in the A register. TCYCLE is then tested at step 801. If TCYCLE=1 the program proceeds to step 802 where it adds TCOLOR to the base address of TBLCY1 minus 1. The resulting address is used to obtain from TBLCY1 a value representing the toast cycle time (in seconds) required to toast to the color specified by display 14. The program then returns to step 703 of the BEGIN routine.

If TCYCLE is not equal to one, the program branches from step 801 to step 803. Depending on TCOLOR and the elapsed time since the last toast cycle, there are certain conditions under which the toast times for cycle 1 may be used for cycles other than cycle 1. These conditions are summarized in Table I.

TABLE I

| TCOLOR | ELAPSED TIME BETWEEN CYCLES |
|---|---|
| 1–2 | (doesn't matter) |
| 3–4 | >6.5 min. |
| 5 | >7.5 min. |
| 6–9 | >8.5 min. |

Step 803 determined whether or not one of the conditions is met which permits the use of the toast times for cycle. TCOLOR is added to the base address of a table TBLINT which stores the values:

TABLE II

| TCOLOR = | 1 | 2 | 3 | 4 | 5 | 6 | 7 | 8 | 9 |
|---|---|---|---|---|---|---|---|---|---|
| TBLINT = | 00 | 00 | 00 | 09 | 09 | 0A | 0B | 0B | 0B | 0B |

Depending on the value of TCOLOR, one of the values is read from TBLINT and compared with TINT. The values stored in TINTI are such that TINT represents an interval of time that has elapsed since the last cycle as shown in Table III.

TABLE III

| TINT (HEX) | ELAPSED TIME X |
|---|---|
| 0 | X < 7 sec. |
| 1 | 7 < X < 22 sec. |
| 2 | 22 < X < 45 sec. |
| 3 | 45 sec < X < 1.5 min. |
| 4 | 1.5 < X < 2.5 min. |
| 5 | 2.5 < X < 3.5 min. |
| 6 | 3.5 < X < 4.5 min. |
| 7 | 4.5 < X < 5.5 min. |
| 8 | 5.5 < X < 6.5 min. |
| 9 | 6.5 < X < 7.5 min. |
| A | 7.5 < X < 8.5 min. |
| B | 8.5 < X < 9.5 min. |
| C | 9.5 < X < 10 min. |

If TINT is greater than or equal to the value read from TBLINT then the times from the table for cycle 1 (TBLCY1) may be used. The program branches from step 803 to step 802, uses TCOLOR to index into TBLCY1, and reads out a value representing the toasting cycle time in seconds. The program then returns to BEGIN.

If the test at step 803 shows that TBLINT is greater than TINT then a toast cycle time value from TBLCY1 cannot be used. Instead, a table (TTBL) of toast cycle time values is accessed using TCOLOR, TINT and TCYCLE. Generally speaking, TTBL is accessed using an index value read from an index table TCINX.

TABLE IV

| TCINX | TBL 323 | TBL 345 |
|---|---|---|
| | TBL 423 | TBL 445 |
| | TBL 523 | TBL 545 |
| | TBL 623 | TBL 645 |
| | TBL 723 | TBL 745 |
| | TBL 823 | TBL 845 |
| | TBL 823 | TBL 845 |

As shown in Table IV, TCINX stores 14 index values at consecutive memory addresses beginning at the base address TCINX. There are two index values stored in the table for each value of TCOLOR from 3 to 9. The reason there are two values for each color is that experimentation has shown that the same heating times may be used for TCYCLE=2 or 3 but a different set of heating times must be used if TCYCLE=4 or 5.

TABLE V

| TTBL | TBL 823 | T1 | T2 | T4 | T5 | T6 | T7 | T8 | T9 | T10 | T11 |
|---|---|---|---|---|---|---|---|---|---|---|---|
| | TBL 845 | . | . | . | . | . | . | . | . | . | . |
| | TBL 723 | . | . | . | . | . | . | . | . | . | . |
| | TBL 745 | . | . | . | . | . | . | . | . | . | . |
| | TBL 623 | . | . | . | . | . | . | . | . | . | . |
| | TBL 645 | . | . | . | . | . | . | . | . | . | . |
| | TBL 523 | . | . | . | . | . | . | . | . | . | . |
| | TBL 545 | . | . | . | . | . | . | . | . | . | . |
| | TBL 423 | . | . | . | . | . | . | . | . | . | . |
| | TBL 445 | . | . | . | . | . | . | . | . | . | . |
| | TBL 323 | . | . | . | . | . | . | . | . | . | . |
| | TBL 345 | . | . | . | . | . | . | . | . | . | . |

An index value read from TCINX is added to the base address of the table TTBL (and further incremented by TINT) in order to read a toast cycle time from TTBL. Actually, TTBL (see Table V) comprises twelve subtables, two for each value of TCOLOR from 3 to 8. That is, for each value of TCOLOR from 3 to 8 there is one subtable for use if TCYCLE=2 or 3 and another subtable for use if TCYCLE=4 or 5. From Table V it is seen that TBL 823 contains 11 toast cycle times T1–T11 for use when TCOLOR=8, TCYCLE=2 or 3 and TINT has a value from 1 to 11. There is no toast cycle time in TBL 823 for the case where TINT=12 because in this case the test at step 803 will prove true and the toast cycle time is obtained from TBLCY1 at step 802. For the same reason, none of the other subtables of TTBL contain a toast cycle time for the case where TINT=12. This is also the reason Table V indicates no toast cycle time is stored in subtables TBL 523 and TBL 545 for the case where TINT=11 and no toast cycle time is stored in subtables TBL 423, TBL 445, TBL 323 or TBL 345 for the cases where TINT=10 or 11. Specific toast cycle times are not shown since they are derived by experimentation and vary with the specific dimensions and materials used in the toaster as well as the size of the heating elements, their spacing from the bread wells, etc. However, it should be noted that the toast cycle times for one subtable are usually not the same as the corresponding toast cycle times for another table. For example, T1 for TBL 823 would usually not have the same value as T1 for TBL 845. On the other hand, the same toast cycle time may be stored at a plurality of locations in one table (i.e. T11 and T12 of TBL 845) or at different locations in two tables (i.e. T9 of TBL 723 may be the same as T6 of TBL 845).

Table V contains no subtables for the case where TCOLOR=1, 2, or 9. Experimentation has shown that for one design of toaster the toast cycle time for TCOLOR=9 can be obtained by adding a constant (12 sec.) to the toast cycle time for TCOLOR=8. For this reason the index table TCINX (Table IV) address TCINX+12 contains the same index value as address TCINX+10 and address TCINX+13 contains the same index value as address TCINX+11.

The reason Table V contains no subtables for TCOLOR=1 or 2 is that for each of these cases the test at step 803 proves true and the toast cycle time is obtained from TBLCY1 at step 802.

In order to access TTBL, steps 804–807 are executed. At step 804 the value 3 is subtracted from TCOLOR because the index values for the case TCOLOR=3 are stored at the first two addresses in TCINX. The result is multiplied by two because TTBL has two subtables for each value of TCOLOR. At step 805 the location TCYCLE is tested to see if it has a value of 3 or less. If TCYCLE=2 or 3 the program branches to step 807 where TCOLOR is added to the base address of TCINX to obtain the address of one of the index values in the left column of Table IV. This index value is added to the base address of TTBL to obtain the base address of one of the subtables shown in Table V. The value of TINT is added in to thus address a specific toast cycle time in the subtable. In actual practice, TINT is added to the index value read from TCINX and the result added to the base address of TTBL to obtain the address of the toast cycle time which is read out.

If the test at step 805 proves false then TCYCLE must be 4 or 5. The value 1 is added to the result obtained at step 804 and the resulting address reads an index value from the right-hand column of Table IV. The operations at step 807 are the same regardless of the value of TCYCLE.

At step 808 TCOLOR is tested and if it has the value 9 then the toast cycle time read from TBL 823 or TBL 845 is incremented by a constant value at step 809. For the toaster configuration used in experiments, this constant was 12 seconds. If the test at step 808 shows TCOLOR=9 then the value read from the subtables is used without modification.

After step 808 or 809 the program returns to BEGIN (FIG. 7) with a toast cycle time value in accumulator A. TMODE is tested at step 703 to see if the toast mode bit is set. If it is, the program executes the sequence of steps 704–707 to make adjustments to the toast cycle time if TCOLOR is greater than 1 and the last cycle mode was bakery. LMODE is tested at step 704 and if the last toast cycle was not in the bakery mode the program branches to step 707. If the last cycle was in the bakery mode the program tests for TCOLOR=1. If the test proves true a branch is made to step 707. If TCOLOR=1 then TCOLOR is decremented at step 706 before moving to step 707.

At step 707 the program jumps to the GTIME subroutine (FIG. 8) to obtain a new toast cycle time. The new toast cycle time will be shorter than the toast cycle time obtained at step 702 if TCOLOR was decremented at step 706. Although the center heating element receives half-wave rectified current in the bakery mode, the overall cycle time, for a given color, is greater for the bakery mode than for the toast mode. Decrementing TCOLOR at step 706 compensates for this If TCOLOR=1 or if LMODE was not bakery, then the toast cycle time obtained at step 707 will be the same as that obtained at step 702.

If the test at step 703 shows that the toast mode bit is not set, the program branches to step 712 where MODE is tested to see if the pastry bit is set. If it is not, then the toaster must be in the bakery mode. Eighty seconds is added to the toast cycle time obtained from TTBL during execution of step 702. At step 714 TCOLOR is tested. If TCOLOR<5 then another 20 seconds is added at step 715. TCOLOR is tested again at step 716 and if TCOLOR <7 then 5 seconds is subtracted at step 717.

After step 717, or after step 714 or 716 if one of the tests proves true, step 718 is executed to energize the bakery relay 54 so that relay contacts 54a are opened and half-wave AC is applied to the center heating element 36 through diode 112.

After step 707 is executed for the toast mode or step 718 is executed for the bakery mode, the toast cycle time is saved at TEMP. Step 709 tests TCYCLE and if TCYCLE=1 the program branches to BEGINY to begin the toasting control. However, if TYCYCLE≠1 then a further compensation is derived by executing a compensation subroutine at step 710 and adding it to the saved toast cycle time at step 711 before proceeding to BEGINY.

The COMP subroutine is shown in FIG. 9 and begins by comparing TCOLOR and TLAST. If the toast color for the previous toast cycle is equal to the toast color for the present cycle then no compensation is required. The program branches from 900 to 902 where it loads a zero compensation value in A before returning to step 711.

If the test at step 900 proves false then compensation is required if the time that has elapsed since the end of the last cycle is less than about 4 minutes. This is determined by testing TINT at step 901. If TINT is equal to or greater than 6 then the elapsed time is greater than about four minutes (see Table III) and no compensation is required. The program branches to step 902, enters a zero compensation value in A, and returns to step 711.

If the elapsed time since the last cycle is less than about four minutes the test at step 901 proves false and at step 903 the value 1B is loaded in A. TINT is then tested at step 904 to see if the elapsed time is greater than about 2 minutes (TINT equal to or greater than 4) and if it is the program branches to step 910. If it is not, the value 12 replaces the value entered in A at step 903 and TINT is tested at step 906 to see if the elapsed time is about 1 minute (TINT=3). If it is the program branches to step 910. If it is not then the value ⌀9 is loaded in A at step 907 and at step 908 TINT is tested to see if the elapsed time is about 30 seconds (TINT=2). If it is the program branches to step 910 but if it is not the value zero is loaded in A before moving to step 910.

Stored in the ROM at consecutive locations are four index tables COMINX1–COMINX4, corresponding to elapsed times of less than 30 sec., 30 sec, 1 min. and 2–4 min, respectively. The value entered in A at step 903, 905, 907 or 909 is an offset value which, when added to the base address of COMINX1, gives the base address of the index table to be used. Each index table stores nine index values, one for each possible toast color. At step 910 TCOLOR is added to the offset value in A and the result is decremented because there is no TCOLOR=⌀. The resulting value is added to the base address of COMINX1 in order to read an index value from one of the tables. These tables are shown in Table VI.

TABLE VI

| | |
|---|---|
| COMINX1 | CTBL1-CTBL1 CTBL2-CTBL1 CTBL3-CTBL1 CTBL4-CTBL1 CTBL5-CTBL1 CTBL6-CTBL1 CTBL7-CTBL1 CTBL8-CTBL1 CTBL9-CTBL1 |
| COMINX2 | CTBLA-CTBL1 CTBL1-CTBL1 CTBLB-CTBL1 CTBLC-CTBL1 CTBLD-CTBL1 CTBLE-CTBL1 CTBLF-CTBL1 CTBLG-CTBL1 CTBLH-CTBL1 |
| COMINX3 | CTBLI-CTBL1 CTBLI-CTBL1 CTBLJ-CTBL1 CTBLK-CTBL1 CTBLK-CTBL1 CTBLL-CTBL1 CTBLM-CTBL1 CTBLN-CTBL1 CTBLO-CTBL1 |
| COMINX4 | CTBLL-CTBL1 CTBLL-CTBL1 CTBLB-CTBL1 CTBLB-CTBL1 CTBLP-CTBL1 CTBLQ-CTBL1 CTBLR-CTBL1 CTBLR-CTBL1 CTBLS-CTBL1 |

The index value read from the tables is added to TLAST and the result decremented by one to obtain an offset into the compensation table shown in Table VII.

TABLE VII

| | | | | | | | | |
|---|---|---|---|---|---|---|---|---|
| CTBL1 | T1 | T2 | T3 | T4 | T5 | T6 | T7 | T8 | T9 |
| . | | | | | | | | |
| . | | | | | | | | |
| CTBL9 | T1 | T2 | T3 | T4 | T5 | T6 | T7 | T8 | T9 |
| CTBLA | T1 | T2 | T3 | T4 | T5 | T6 | T7 | T8 | T9 |
| . | | | | | | | | |
| . | | | | | | | | |
| CTBLS | T1 | T2 | T3 | T4 | T5 | T6 | T7 | T8 | T9 |

This table comprises 28 subtables CTBL1-CTBL9 and CTBLA-CTBLS stored at consecutive locations in the ROM. Each subtable has nine entries, one for each possible value of TLAST. The amount of compensation time is dependent not only on the elapsed time since the last cycle but also on the toast color during the last cycle. At step 910 TLAST is added to the index read from COMINX4-COMINX4, one is subtracted from the total, and the result added to the base address of CTBL1. The resulting address is used to read the compensation value from one of the subtables CTBL1-CTBLS.

The program returns from step 910 to step 711 with the compensation value in A. Step 711 adds this compensation which may be a positive or negative value, to the toast cycle time stored at TEMP during step 708. The program then branches to BEGINY.

If the toaster is in the pastry mode then the compensation tables are not accessed. In FIG. 7, if the test at step 712 shows that MODE=PASTRY, the program branches to step 719. Steps 719, 721 and 723 test the value of TCOLOR. If TCOLOR is 8 or 9 the program executes step 720 to subtract 70 seconds from the toast cycle time, and then branches to BEGINY. If TCOLOR=1 or TCOLOR=2 the program executes step 722 or 724 to subtract 13 or 20 seconds from the toast cycle time before branching to BEGINY. If TCOLOR is 4 to 7, the toast cycle time is right-shifted at step 725 to divide its value by 2 before proceeding to BEGINY.

BEGINY is illustrated in FIG. 10 and actually controls the toaster in accordance with the toast cycle time obtained when GTIME was executed and as modified by the various compensations previously described. At step 1000 the original toast color value TCOLOR is restored and the toast cycle time is stored at CTIME. The compensated toast cycle time is either the value obtained from the tables at step 702 as modified at steps 713-717 and 711, the value obtained from the tables at step 702 as modified at steps 720, 722, 724, or 725, or the value obtained from the tables at step 707 and modified at step 711.

At step 1002 the program jumps to STO (FIG. 6) wherein, at step 602 the compensated toast cycle time is stored at location SEC and the program flags are all cleared. The program returns to step 1004 of FIG. 10 where it jumps to the DUP subroutine of FIG. 4 to update the display. After the display is updated the program returns to step 1006 of FIG. 10 and jumps to TUP2 (FIG. 3) for the purpose of resetting the TIMER=$\phi$ flag and reloading the TDR register with a value corresponding to 25ms. The program then returns to step 1008 of FIG. 10 where it enters the BEGIN1 loop.

The BEGIN1 loop of instructions comprising steps 1008 to 1020 is repeatedly executed until the toast cycle is terminated. Termination can occur because the total toast cycle time stored in SEC at step 1000 has been decremented to zero, or it can occur because the lift lever 29 has been manually raised. During the toasting cycle the program repeatedly executes steps 1008, 1016 and 1020, the test at step 1008 proving true once each 25ms when the TDR register is decremented to 0 and sets the Timer=$\phi$ flag. At step 1016 PC$\phi$ is tested to see if the lift lever 29 is still down. Assuming it is down, the Lifter Down flag is set at step 1018.

Step 1020 tests the Timeout flag and if it is not set the program branches back to step 1008. Step 1020 tests for the normal ending of a toast cycle.

Every 25ms during the toast cycle the test at step 1008 proves true and the program jumps to step 300 of TUP where the high order bit of QMIN is set. By setting a high value in QMIN, the test at 316 will prove false thus bypassing steps 318 and 322 which would change TINT, TCYCLE and LMODE. Every time TUP is executed SUBSEC is decremented at step 304. Every fourth time TUP is executed, that is, once each second, the toast cycle time in SEC is decremented at step 308 and tested at step 310 to see if it has been reduced to zero. If it has, the toaster has completed the required toast cycle time so the Timeout flag is set at step 312. Each time the program returns from TUP to step 1012 the Lifter Down flag is tested. It is then cleared at step 1014 prior to again testing PC$\phi$ at step 1016 to see if the lift lever 29 is still down.

If the Timeout flag is set at step 312, the test at step 1020 proves true and the program proceeds to step 1022 where a signal is sent to PA3 to energize relay 118. The contacts 118a close to energize the solenoid 52 thereby permitting the lift lever to rise under spring tension. This opens switches 30a and 30b to terminate power to the heating elements 32, 34 and 36.

The signal to energize solenoid 52 is applied for 250ms. At step 1024 the program jumps to TUP (FIG. 3) to reset the Timer=$\phi$ flag and set TDR to time a 25ms interval. Upon a return to step 1026, TICK is set to time the 250ms interval. Step 1028 is then repeatedly executed to test the Timer=$\phi$ flag to see if 25ms has elapsed. When the time has elapsed the program jumps to TUP$\phi$ to decrement TICK. Upon the return from TUP, TICK is tested at step 1032. If it is not zero the program branches back to step 1028. If it is zero then step 1034 is executed to terminate the signal to PA3 and relay 118. The sound transducer is then energized for 0.75 sec by a signal sent to PA4.

At step 1036 a jump is made to TUP2 to again reset the Timer=φ flag and set TDR to time a 25ms interval. Upon the return from TUP TICK is set to time a 2.25 sec interval and the program moves to BEGIN9 shown in FIG. 11.

At step 1100 the Lifter Down flag is reset. The Timer=φ flag is tested at step 1102 to see if 25ms has expired. If it has not, the program checks PCφ to see if the lift lever 29 is still down. If it is not, the program branches back to step 1102. If the lift lever is still down then the Lifter Down flag is set at step 1106 before branching back to step 1102.

Every 25ms the test at step 1102 proves true and a jump is made to TUPφ to decrement TICK, reset the timer to time 25ms, and reset the Timer=φ flag. Upon the return from TUP the Lifter Down flag is tested to see if the lift lever is still down. If it is not, then the program branches to DONE (FIG. 12).

If the lifter is still down, TICK is tested at step 1112 to see if 2.25 seconds has expired. If it has not then the program branches back to step 1100. If 2.25 seconds has expired the program branches back to BEGIN8 (FIG. 10) to again try to release the lift lever by energizing solenoid 52 for 250ms. The sound transducer 26 is also energized again. Thus, if the lift lever is not released at the end of a toast cycle the transducer is energized to sound a 0.75 sec. alarm at 2.25 sec intervals.

As previously described, the end of the toasting operation is detected at step 1012 if the lift lever 29 is manually operated or at step 1110 if the full toasting time has elapsed. In either case, the program branches to the DONE routine (FIG. 12) to perform various updating operations depending on how the toasting operation is terminated.

At step 1200 signals are sent to PA2 and PA3 to deenergize relays 54 and 118. This insures that the port output signals are no longer at a level to energize the relays in the case where the toast cycle is terminated by manually raising the lift lever 29. If a full toast cycle was completed, the timeout flag was set at step 1010 or more particularly at step 312 after the toast cycle time in SEC was decremented to zero. The flag is tested at step 1202 and if it is set the program executes steps 1220 and 1222 to transfer TCOLOR to TLAST and MODE to LMODE. Thus the TCOLOR and MODE for the cycle just completed become the last cycle color and last cycle mode for the next toast cycle.

TCYCLE is incremented at step 1222 and tested at step 1224 to see if it has the value 6. If not, the program branches to step 1228 which is a jump to TUP1B where TINT is set to zero, SUBSEC is set to time one second, the timer is set to time 25ms, an the Timer=φ flag is reset. Upon a return to the DONE routine the program branches to RUN (FIG. 2). The toaster is now ready to begin another cycle and enters the RUN1 loop where it repeatedly checks to see if the lift lever has been depressed or the mode or color switch pushed, as previously described.

It has been found that 6 or more prior toast cycles do not have any greater effect on toast color than 5 prior toast cycles. Therefore, if the test at step 1224 shows the TCYCLE has been incremented to 6, it is reduced to 5 at step 1226 before proceeding to step 1228.

The housekeeping functions performed by DONE when a cycle is terminated by manually raising the lift lever vary depending on the length of time that the lift lever is down. If it is down less than 5 seconds, there is not sufficient heat generated to affect the next cycle. In this case, the test at step 1202 proves false so at step 1204 SEC is subtracted from CTIME and the result tested to see if the elapsed time is less than 5. If it is, the program branches at step 1228 to TUP1B to clear TINT and update the timers before branching to RUN.

If the test at step 1204 shows that the manually terminated cycle lasted 5 or more seconds, some adjustments are necessary to account for the partial cycle. At step 1206 the elapsed time calculated at step 1204 is saved at TEMP, TCOLOR is saved at TEMP1 and the relatch index value STINT, previously saved at step 700, is transferred to TINT. At step 1208 TCOLOR is checked to see if it has a value of 1. If it does, the program branches to 1218 where TCOLOR is placed in A and TEMP1 is transferred to TCOLOR. A branch is then made to step 1222 and from there proceeds as previously described.

It will be noted that when TCOLOR=1 TLAST is set to TCOLOR, LMODE is set to MODE and TCYCLE is incremented, just as for a complete toasting cycle. However, if the test at step 1208 shows TCOLORφ1 then some decremented value of TCOLOR is transferred to TLAST at step 1222. This decremented value is obtained as follows. At step 1210 TCOLOR is decremented and at step 1212 a jump is made to GTIME to obtain a toast cycle time for the decremented TCOLOR. The toast cycle time thus obtained is decremented at 1214 and compared with the elapsed time of the terminated cycle. If the adjusted color level time is greater than the elapsed time then the program branches back to step 1208.

The loop comprising steps 1208, 1210, 1212, 1214 and 1216 is repeated with TCOLOR being decremented each time the loop is executed. The loop is repeated until TCOLOR is reduced to a level such that if it were the TCOLOR selected for the terminated cycle (by operation of switch 24) the toast cycle time would be equal to or greater than the time that actually elapsed before the cycle was terminated. At this time the test at step 1216 proves true so the program proceeds to step 1218 where the adjusted TCOLOR is loaded into A. The program then branches to step 1222 where the adjusted toast color is stored at TLAST so that on the next toast cycle it appears to the program that on the previous cycle a toasting cycle was made for the adjusted toast color value.

Except for making TLAST the same as the adjusted toast color value, steps 1222, 1224, 1226 and 1228 are executed as previously described before the program branches to RUN to wait for the beginning of a new cycle.

From the foregoing description it is seen that a toaster constructed in accordance with the principles of the present invention includes means for digitally controlling toast cycles in a toast, pastry or bakery mode to accurately toast a product to a predetermined color. The timing of cycles is accomplished by wholly digital means and means are provided to compensate for various factors affecting the initial temperature of the toaster at the beginning of a cycle. Such factors include the elapsed time between the last cycle and the present one, the mode of the last cycle, the color to which the product was toasted during the last cycle, and the number of cycles within the last ten minutes. While certain specific values have been given to illustrate a preferred embodiment, it will be understood that these values may, and probably will, vary depending on the mechanical structure of the toaster used. Furthermore, various modifications and substitutions may be made in the disclosed embodiment without departing from the spirit and scope of the invention as defined in the appended claims. For example, one or more of the electromagnetic relays might be replaced with an electro-optical relay.

The embodiments of the invention in which an exclusive property or privilege are claimed are defined as follows:

1. In a toaster having heating means, lifter means for lowering a product into a toasting position, means including switch means responsive to said lifter means for applying power to said heating means when said lifter means has lowered said product into said toasting position, and a solenoid for releasing said lifter means, the improvement comprising:

a microcomputer;

a toast color selection switch;

memory means for storing digital values including the toast color (TCOLOR) selected by said toast color selection switch, and tables of toast cycle times;

said microcomputer including means for selecting one of said toast cycle times from said tables in accordance with the stored value TCOLOR and generating an output signal after an interval which is dependent upon the selected toast cycle time;

means responsive to said output signal for energizing said solenoid to release said lifter whereby said switch means is operated to remove power from said heating means;

wherein said toaster includes a toaster mode selection switch and said memory means stores a mode value (MODE) indicative of one of a plurality of modes of operation of said toaster as selected by said toaster mode selection switch said microcomputer being responsive to a given value of MODE for producing a second output signal, and means responsive to said second output signal for controlling said means for applying power to said heating means; and wherein said heating means comprises a plurality of heating elements, said means for applying power includes means for normally applying full wave AC power to said heating elements and said means for controlling said means for applying power includes circuit means for applying half-wave rectified AC power to at least one of said heating elements.

2. In a toaster having heating means, lifter means for lowering a product into a toasting position, means including switch means responsive to said lifter means for applying power to said heating means when said lifter means has lowered said product into said toasting position, and a solenoid for releasing said lifter means, the improvement comprising:

a microcomputer;

a toast color selection switch;

memory means for storing digital values including the toast color (TCOLOR) selected by said toast color selection switch, and tables of toast cycle times;

said microcomputer including means for selecting one of said toast cycle times from said tables in accordance with the stored value TCOLOR and generating an output signal after an interval which is dependent upon the selected toast cycle time;

means responsive to said output signal for energizing said solenoid to release said lifter whereby said switch means is operated to remove power from said heating means;

wherein said toaster includes a toaster mode selection switch and said memory means stored a mode value (MODE) indicative of one of a plurality of modes of operation of said toaster as selected by said toaster mode selection switch said microcomputer being responsive to a given value of MODE for producing a second output signal, and means responsive to said second output signal for controlling said means for applying power to said heating means; and wherein said microcomputer includes means for timing the interval between the end of a toast cycle and the beginning of the next one and storing an indication of said interval (TINT) as one of said values in said memory means; and wherein said microcomputer includes means for storing in said memory means the mode value and toast color value for a given cycle as a last toast cycle mode value (LMODE) and a last toast cycle color (TLAST), one of the values stored in said memory means being an indication of the number of toaster cycles within a given interval of time (TCYCLE), said microcomputer including means for incrementing TCYCLE once for each toaster cycle exceeding a predetermined time.

3. The improvement as claimed in claim 12 wherein said means for selecting a toast cycle time from said tables is responsive to said values TCOLOR, TINT and TCYCLE for addressing said memory means.

4. The improvement as claimed in claim 13 wherein said microcomputer includes means for adding compensation value to a toast cycle time read from said memory means.

5. The improvement as claimed in claim 4 wherein said memory means stores a plurality of compensation tables, each table having a plurality of compensation values said microcomputer including means for comparing the values TCOLOR and TLAST and accessing a given one of said tables determined by TINT only if TCOLOR is not equal to TLAST.

6. The improvement as claimed in claim 5 wherein the microprocessor uses the value TCOLOR to determine which compensation value is read out of the accessed compensation table.

7. The improvement as claimed in claim 6 wherein said lifter means is manually operated and said microprocessor includes means for detecting when power to said heating means is terminated by manual operation of said lifter means during a toasting cycle, means for determining a value of TCOLOR which would have resulted in a complete toaster cycle have a duration corresponding to the actual duration of the terminated cycle, and means for storing said determined value as TLAST so that it may be used in determining a compensation on the next cycle.

8. A toaster comprising:

heating means for heating a product in said toaster;

means for initiating said heating means to begin a toaster cycle;

toast color selecting mans for selecting a toast color to which said product is to be toasted;

a microcomputer including a microprocessor, a digital memory means, and means for generating an indication of elapsed time TINT between the end of a previous toaster cycle and the beginning of a present cycle;

said memory means storing a value TCYCLE representing the number of prior toaster cycles within a predetermined period of time and a plurality of tables, each table having therein a plurality of toast time values representing toast cycle times;

said microcomputer including means responsive to said toast color selecting means, said means for measuring elapsed time and said value representing the number of prior toaster cycles for reading one of said toast time values from one of said tables and terminating heating by said heating means after an interval as specified by said one toast time value.

9. A toaster as claimed in claim 8 and further comprising:

toaster mode selecting means;

said microprocessor including means for modifying said one toast time value in accordance with the mode selected by said toaster mode selecting means.

10. A toaster as claimed in claim 8 wherein the number of said tables is greater than the number of selectable toast colors.

11. A toaster as claimed in claim 8 wherein said means for reading one of said toast time values from one of said tables comprises means for reading a value from a predetermined one of said tables if the value TCYCLE is equal to 1 or if TINT exceeds a predetermined time, said predetermined time having a greater value for a dark toast color selection than for a light toast color selection.

12. A toaster as claimed in claim 8 wherein said plurality of tables includes two for each of certain toast colors selectable by said toast color selection means, and said means for reading one of said toast time values from one of said tables includes means for addressing one or the other of said two subtables depending upon said stored value TCYCLE.

13. A toaster operable in a toast, bakery or pastry mode to heat a product placed therein with a heating means, said toaster having:

manually controllable and latchable means for applying power to said heating means;

a mode selection switch;

a toast color selection switch;

a microcomputer having means or sensing when power is applied to said heating means and is terminated, means for generating indications of intervals of times including the interval between termination of power to said heating means at the end of a previous toast cycle and the application of power to said heating means at the beginning of the present toast cycle, means for generating a value representing the number of toaster cycles occurring within a predetermined interval immediately preceding the present toast cycle, means responsive to said mode selection switch for generating a mode value indicative of the mode selected for the present toast cycle, means responsive to said toast color selection switch for generating a toast color value representing the desired toast color for the present toast cycle, memory means for storing a plurality of digital values including said indication of the interval of time between termination and application of power (TINT), said value representing the number of toaster cycles occurring within a predetermined time (TCYCLE), said mode value (MODE), said toast color value (TCOLOR), a table of toast cycle times, a value representing the mode of the toaster during the previous cycle (LMODE), and, a value representing the selected toast color during the previous cycle (TLAST), means for transferring MODE to LMODE and TCOLOR to TLAST when said means for sensing senses that power to said heating means has been terminated, means responsive to the values TCOLOR, TCYCLE and TINT for addressing said table of toast cycle times to read from said memory means a toast cycle time value indicating the duration of a toasting cycle, and means for producing an output signal when a toast cycle time equal to the value read from said table, has expired; and, means responsive to said output signal for unlatching said means for applying power to said heating means.

14. A toaster as claimed in claim 13 wherein said heating means comprises a plurality of heating elements and said means for applying power includes means for normally applying full wave AC power to all said heating elements, said microcomputer including means for producing a second output signal when said mode selection switch is operated to select said bakery mode, and means responsive to said second output signal for applying half-wave rectified AC power to one of said heating elements.

15. A toaster as claimed in claim 14 wherein said microcomputer includes means for adding a different compensation value to the toast cycle time read from said table of toast cycle times depending upon the values of MODE, LMODE, TCOLOR and TLAST.

16. A toaster as claimed in claim 15 wherein said memory means stores a table of compensation values and said microcomputer includes means for selecting said compensation value from said table of compensation values when TCOLOR is not equal to TLAST and TINT represents an interval less than a predetermined time.

* * * * *

UNITED STATES PATENT AND TRADEMARK OFFICE
CERTIFICATE OF CORRECTION

PATENT NO. : 5,128,521
DATED : July 7, 1992
INVENTOR(S) : Dino D. Lanno et al.

It is certified that error appears in the above-indentified patent and that said Letters Patent is hereby corrected as shown below:

Column 2, line 44, "30b" should read --30b--.

Column 3, line 15, --and-- should be inserted after "60".

Column 3, line 47, "100" should read --∅--.

Column 3, line 63, "PBφ" should read --PB∅--.

Column 3, line 67, "PAφ" should read --PA∅--.

Column 3, line 68, "PAφ" should read --PA∅--.

Column 4, line 22, "PAφ" should read --PA∅--.

Column 4, line 25, "PAφ" should read --PA∅--.

Column 4, line 45, "PBφ" should read --PB∅--.

Column 4, line 51, "PBφ" should read --PB∅--.

Column 4, line 64, "PCφ" should read --PC∅--.

Column 5, line 45-46, application page 11, line 18, "transition" should read --transistor--.

UNITED STATES PATENT AND TRADEMARK OFFICE
CERTIFICATE OF CORRECTION

PATENT NO. : 5,128,521

DATED : July 7, 1992

INVENTOR(S) : Dino D. Lanno et al.

Page 2 of 5

It is certified that error appears in the above-identified patent and that said Letters Patent are hereby corrected as shown below:

Column 6, line 5, "location" should read --location.--

Column 6, line 12, "store" should read --stores--

Column 6, line 14, "φ" should read --Ø--.

Column 6, line 34, "φ" should read --Ø--.

Column 6, line 41, "φ" should read --Ø--.

Column 6, line 44, "PCφ" should read --PCØ--.

Column 6, line 68, "timer = φ" should read --timer = Ø--.

Column 7, line 10, "PBφ" should read --PBØ--.

Column 8, line 31, "φ" should read --Ø--.

Column 8, line 53, "PBφ" should read --PBØ--.

Column 10, line 6, "φ" should read --Ø--.

Column 10, line 51, "PCφ" should read --PCØ--.

Column 11, line 36, "cycle." should read --cycle 1.--.

UNITED STATES PATENT AND TRADEMARK OFFICE
CERTIFICATE OF CORRECTION

PATENT NO. : 5,128,521

DATED : July 7, 1992

INVENTOR(S) : Dino D. Lanno et al.

It is certified that error appears in the above-identified patent and that said Letters Patent are hereby corrected as shown below:

olumn 14, line 2, "this" should read --this.-- olumn 14, line 53, "φ9" should read --Ø9--.

olumn 14, line 68, "φ" should read --Ø--.

olumn 15, line 37, "curing" should read --during--.

olumn 15, line 39, COMINX4-OMINX4" should read --COMINX1-COMINX4--.

olumn 16, line 13, "φ" should read --Ø--.

olumn 16, line 26, "φ" should read --Ø--, "PCφ" should read --CO--.

olumn 16, line 47, "PCφ" should read --PCØ--.

olumn 16, line 58, "φ" should read --Ø--.

olumn 16, line 61, "φ" should read --Ø--.

olumn 16, line 63, "TUPφ" should read --TUPØ--.

olumn 17, line 2, "φ" should read --Ø--.

olumn 17, line 7, "φ" should read --Ø--.

UNITED STATES PATENT AND TRADEMARK OFFICE
CERTIFICATE OF CORRECTION

PATENT NO. : 5,128,521

DATED : July 7, 1992

INVENTOR(S) : Dino D. Lanno et al.

It is certified that error appears in the above-identified patent and that said Letters Patent are hereby corrected as shown below:

Column 17, line 8, "PCϕ" should read --PCØ--.

Column 17, line 14, "TUPϕ" should read --TUPØ--.

Column 17, line 15, "ϕ" should read --Ø--.

Column 17, line 52, "ϕ" should read --Ø--.

Column 17, line 52, "an" should read --and--.

Column 18, line 21-22, COLORϕ1then" should read --TCOLOR≠1 then--.

Column 20, line 6, "stored" should read --stores--.

Column 20, line 30, "claim 12" should read --claim 2--.

Column 20, line 34, "claim 13" should read --claim 3--.

Column 20, line 55, Claim 7, "have" should read --having--.

Column 20, line 64, Claim 8, "mans", should read --means--

UNITED STATES PATENT AND TRADEMARK OFFICE
CERTIFICATE OF CORRECTION

PATENT NO. : 5,128,521

DATED : July 7, 1992

INVENTOR(S) : Dino D. Lanno et al.

It is certified that error appears in the above-identified patent and that said Letters Patent are hereby corrected as shown below:

Column 21, line 34,
--subtables-- should be inserted after "two".

Column 21, line 48, "or"
should read --for--.

Signed and Sealed this

Eighth Day of October, 1996

Attest:

Attesting Officer

BRUCE LEHMAN

Commissioner of Patents and Trademarks